Patented Apr. 18, 1950

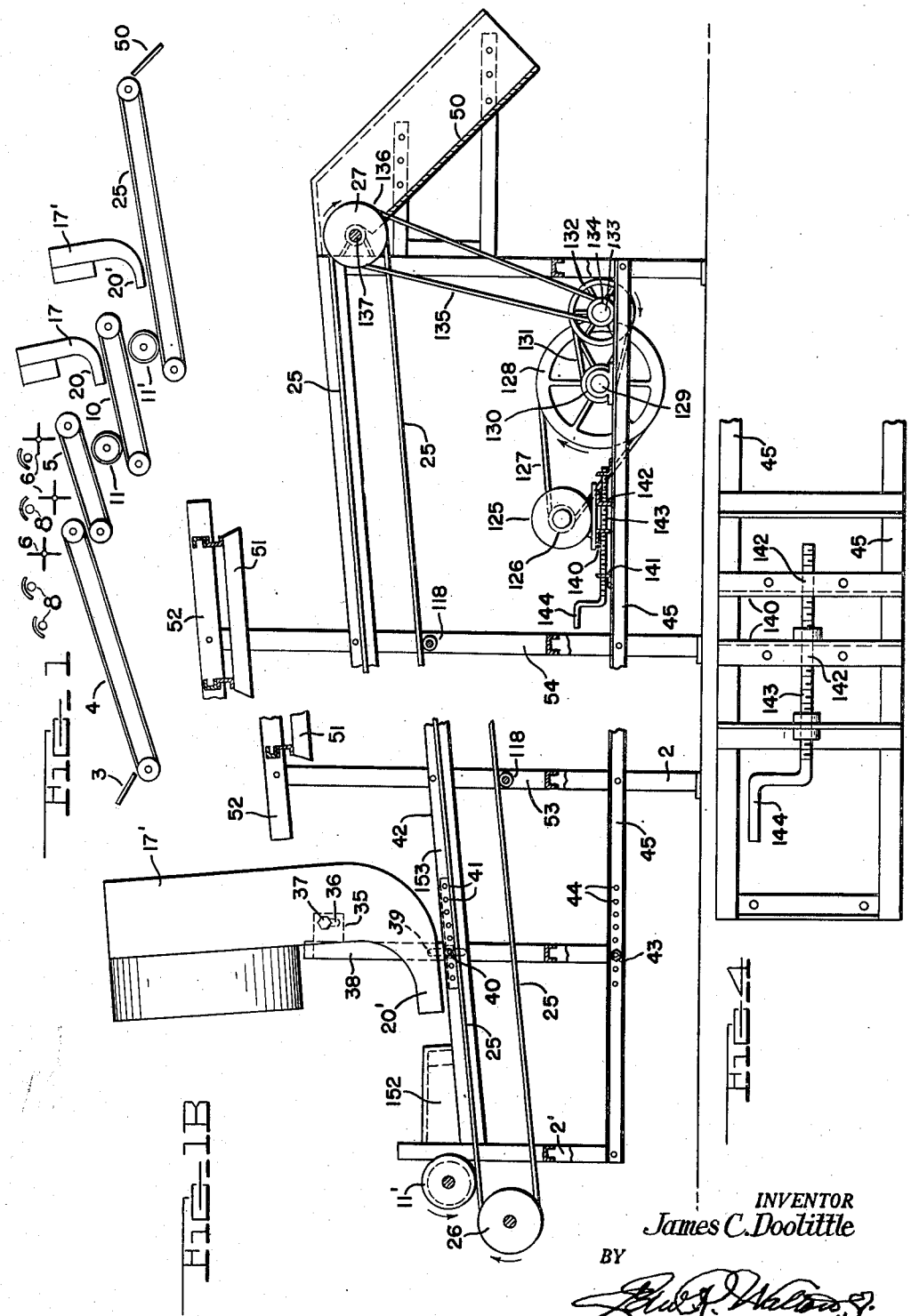

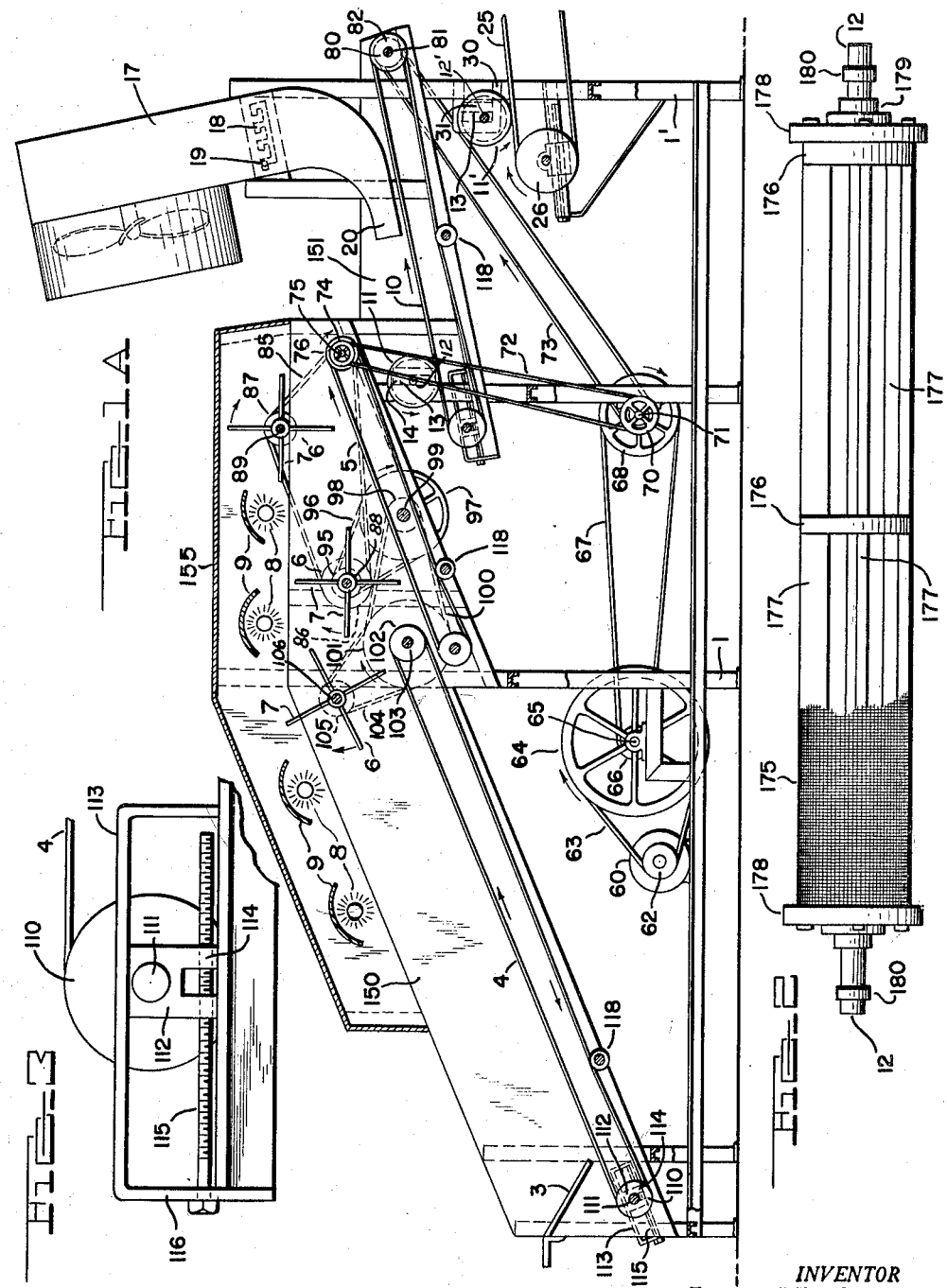

2,504,946

UNITED STATES PATENT OFFICE 2,504,946

VEGETABLE CLEANING MACHINE

James C. Doolittle, Belle Glade, Fla., assignor to American Machinery Corporation, Orlando, Fla., a corporation of Florida Application February 13, 1946, Serial No. 647,372

13 Claims. (Cl. 209—45)

This invention relates to vegetable cleaning machines and more particularly to that type of machine that is adapted to separate elongated pod-type vegetables, such as green beans, from the dirt and trash that is collected with said vegetables when they are picked from the vines.

Heretofore, the separating of podded vegetables from the trash, such as stems, leaves and the like, which are collected with the vegetables when they are picked, has been effected by hand labor to a vast extent. Of course, this has been a time-consuming and costly process and, consequently, attempts have been made to develop machines to perform this operation.

One such machine, and probably as successful as any of the prior machines, comprises a pair of upwardly inclined driven endless belts, the first of which merely by its inclination and movement, causes the piles of beans to level off in a relatively even layer. A series of rotating fingers are mounted above the second belt so as to break up any entanglements of the beans with the trash from the vines that have adhered thereto. The separation of the beans from the trash is further effected by a shaker platform to which the beans are dumped from the second belt. The shaker platform is inclined downwardly very slightly and the motion of the platform shakes the beans loose from the trash, the beans and the trash gradually being worked down the platform by the vibratory movement onto a grading belt, the beans being subjected to an air stream between the shaker and the grading belt in order to blow away the trash that has been shaken loose from the beans.

While this prior art machine has been successful to a degree, it has not completely satisfied the requirements of the processors. Needless to say, the shaking of the beans by the platform is a time-consuming operation, the movement along the platform being very slow. The machine is relatively expensive since a large number of parts are required for producing and operating the shaker mechanism and, furthermore, considerable and rapid wear of the shaker mechanism required frequent overhauling and replacement of parts. Moreover, it was found that the oscillating motion imparted to the shaker mechanism had a tendency to loosen the whole machine and consequently create the need for servicing and repair of other portions of the machine of which such repair would not normally be required. In the final analysis, it was found that the machine did not clean the beans as completely as desired and consequently, by and large, the processors returned to the hand separating and cleaning method.

Having in mind the defects of the prior art methods and apparatus, it is an object of the present invention to provide a machine that is rapid in operation, by many fold, and yet will completely clean the podded vegetables handled thereby. It is contemplated that the machine have a minimum of moving parts and that the motion employed will be smooth, rather than vibratory, so that there is no more than normal wear and tear of the moving parts and no undue strain imparted to other portions of the machine. It is within the concept of the invention that the trash be separated and removed from the podded vegetables solely by the use of properly applied and utilized air streams, repeatedly, at different cleaning stations. It is also desirable to sterilize the vegetables as well as clean them physically. It naturally follows that it is desirable that the present machine comprise simplicity of design and economy of construction, operation and maintenance.

The foregoing objects and others ancillary thereto are accomplished in accordance with a preferred embodiment of the present invention which is similar to the hereinbefore described prior art machine in that a series of two upwardly inclined endless belts are employed for receiving the picked vegetables and causing them to tumble over the belts to form a relatively even layer thereon, rotating fingers being mounted above the second belt and adapted to break up any entangled bunches of the vegetables and trash collected therewith, these rotating fingers also tend to orient the elongated vegetables on the belt longitudinally thereof so as to represent less surface resistance to the air currents that are used for the cleaning action.

At this point, however, the similarity between the machines of the prior art and the present invention terminates in view of the fact that instead of passing through a shaker, which involves considerable time in operation and wear of parts, the vegetables, in the present apparatus, are first subjected to germicidal radiation while being agitated and then dropped from the second belt to a third or cleaning belt. When dropping to and landing on this third belt, the vegetables are subjected to the blast of a continuous air stream which cools the radiation treated vegetables and has a velocity sufficient to blow all the trash and dirt rearwardly against a perforated or foraminous cylinder, such as a wire roller or cylindrical screen, whereas the podded vegetables being heavier, are capable of withstanding the air stream and of being transported by the belt against the air stream past the nozzle from which the stream emanates. The cleaning belt has an upward inclination in the direction of travel to facilitate the removal of dirt, which is blown down the incline, whereas the beans are transported upwardly.

The foraminous cylinder is loosely journaled above the end of the cleaning belt so as to contact the belt and be rotated by frictional engagement therewith. As the belt is driven toward the air stream, the cylinder will be rotated in an upward direction, with respect to the air stream, and consequently, as trash is blown against the cylinder, and held there by air pressure, it will be carried upwardly by the cylinder and over the same. The trash is held against the cylinder by the air stream in view of the fact that the air may pass through the cylinder rather than having to pass therearound, which would cause eddy currents. As the trash passes over the cylinder and down the other side it is carried to the side of the cylinder opposite the nozzle where it is again subjected to the force of the air stream passing through the cylinder which causes it to be blown to the floor beneath the machine.

Complete cleaning of the podded vegetables is assured by subjecting them to a second air stream when they are dropped from the third, or cleaning belt, to the fourth, or grading, belt. The structure and operation of the apparatus employed at this second cleaning station is identical to that hereinbefore described in that a foraminous cylinder is loosely mounted above the end of, and in frictional contact with, the grading belt, an air stream being directed along the belt against the cylinder. The whole cleaning operation is extremely rapid as the cleaning operation is effected while the beams are in motion, both while dropping between belts and while moving along the belt toward the nozzle.

After the second cleaning, the vegetables are transported along the grading belt where they are graded, illuminating devices being built on the belt supporting structure to insure proper lighting for the grading operation. The devices for producing and directing the air streams are adjustably mounted so that they may be adjustably positioned relative to the belts and foraminous cylinders. Suitable drives are provided for motivating the various driven parts of the apparatus, one for the leveling and cleaning belts and the other for the elongated grading belt, separate drives being employed as a matter of convenience.

The novel features that are considered characteristic of the invention are set forth with particularity in the appended claims. The invention itself, however, both as to its organization and its method of operation, will best be understood from the following description of a specific embodiment when read in connection with the accompanying drawings, in which:

Fig. 1 is a schematic side view in elevation of the working elements of the machine;

Fig. 1A is a cross-sectional view taken longitudinally through the portion of the machine including the leveling and cleaning belts;

Fig. 1B is a cross-sectional view taken longitudinally through the portion of the machine including the grading belt;

Fig. 2 is a front view in elevation of a perforated cylinder with a portion of the cylindrical screening removed to show the supporting structure of the cylinder;

Fig. 3 is a side view in elevation of an adjustable mounting for the belt pulleys; and Fig. 4 is a plan view of an adjustable mounting for a motor.

According to the preferred embodiment of the invention, the machine may comprise a supporting structure 1 that supports the bean cleaning apparatus, as shown in Fig. 1A and a structure 2 that supports the grading table, as shown in Fig. 1B, the end upright 2' of the structure 2 being bolted to and supported by the end upright 1' of the structure 1, so that the whole structure is combined as a single unit when in operation, as schematically shown in Fig. 1.

Starting from the beginning, with respect to the operation involved, references being made to Figs. 1 and 1A, the machine comprises a dumping table 3 that is inclined downwardly so as to drop the beans dumped thereon to a relatively slow driven upwardly inclined endless belt 4.

As the beans are moved upwardly by the belt 4 they are separated to a degree by tumbling over the belt, the tumbling being caused by both the incline and the motion of the belt. To insure breaking up of bunches and relatively even spreading of the beans over the working surfaces, they are passed near the top of the belt 4, beneath a reel 6 comprising radially extending metal fingers 7 that are rotated against the direction of bean travel to break up the bunches of beans and trash collected therewith, and to initially level and align the beans longitudinally with respect to the direction of travel.

The beans are then dumped from the upper end of the belt 4 to a relatively faster driven endless belt 5 which is inclined at the same angle as the belt 4. The belt 5 is relatively short and has positioned thereover a pair of the reels 6 composed of metal fingers 7 that are likewise rotated against the direction of bean travel so as to break up any remaining bunches of beans and trash, and to finally level and align the beans longitudinally with respect to the direction of travel.

As the beans travel over the belts 4 and 5 they pass beneath a bank of germicidal lamps such as mercury vapor ultra-violet lamps. These lamps 8 are, preferably embodied in the form of elongated cylinders that extend substantially across the width of the flow of beans. The germicidal or ultra-violet radiation produced by these lamps is lethal to practically all germs or bacteria and consequently it disinfects the beans as they are transported beneath the lamps. As the beans are tumbled about, both by the incline and motion of the belts 4 and 5 and by action of the fingers 7, substantially all of them are exposed to the sterilization action of the germicidal radiation. Reflectors 9 are preferably mounted above the lamps 8 to concentrate the radiation on the beans. This radiation treatment has proven highly beneficial in controlling mold from developing on the beans.

By the time the beans reach the upper end of the belt 5 they are evenly spread thereover and flow in a relatively even stream over the end of the belt 5 onto an endless cleaning belt 10 driven at substantially the same speed as belt 5. The cleaning belt 10 is inclined upwardly but at a lesser degree than the inclination of the belts 4 and 5. A foraminous obstruction or perforated cylinder 11, such as a cylindrical screen or wire roller, is mounted to ride on the belt 10 and to be frictionally rotated thereby, the cylinder being provided with shafts 12 which are freely journaled in slots 13 formed by a U-shaped brace 14 whose ends are fixed to one of the uprights of the structure 1. A blower 17, which may be of any desired type, is removably and adjustably supported by the structure 1 over the belt 10 by means of bolts 19 which extend through an elongated slot 18 having a series of inverted L-shaped branch slots. The blower 17 is provided with a downwardly and forwardly curved nozzle 20 that extends the full width of the belt 10 and blows a stream of air substantially parallel with the belt 10 toward the wire roller 11.

Thus as the beans are dropped from the belt 5 to the belt 10 the air from the nozzle 20 will blow the trash rearwardly against the foraminous cylinder or revolving screen 11, the trash being held against the cylinder by the air stream as the air can pass through the cylinder rather than having to pass around the cylinder and producing eddy currents. The trash is transported by the roller to the side opposite the nozzle 20, whereupon the air stream passing through the wire roller or screen blows the trash from the roller so that it may fall to the ground or be collected by any suitable manner. The screen serves as a perforated backwall which is continuously moving upwardly and against which the material is blown and to which the trash will adhere, permitting the beans to drop to the belt due to their greater specific gravity. Due to the fact that the screen is rotated the trash is lifted from the belt, reversing its direction of travel so to speak, and removed from the beans as the beans are moved in another direction by the belt. The velocity of the air stream is not sufficient to blow and hold the properly developed bean pods of normal size and weight against the roller, however, so that they drop to and remain on the belt 10 and travel forwardly therewith beneath the nozzle 20 which is spaced above the belt 10 sufficiently to permit their passage. The blast of air from the nozzle 20 has the additional action of quickly cooling the beans after their radiation treatment. The velocity of the air stream may be such as found adequate in use. However, it may be stated for purposes of information that in the devices now in use the air stream may vary from 3000 to 5500 feet per minute; but an optimum velocity ranging in the order of 3400 to 4500 feet per minute at the discharge of the blower is usually employed and gives very satisfactory results.

After this initial cleaning treatment, the beans are dumped from the upper end of the belt 10 onto an elongated, driven, endless grading belt 25 which is supported at one end by a pulley 26 mounted on the supporting structure 1 and at the other end by a pulley 27 mounted at the extreme end of the supporting structure 2, as shown in Fig. 1B. As the beans are dumped to the grading belt 25 they are subjected to further cleaning by an air stream directed over the belt 25 by a nozzle 20' of a blower 17' whereupon any remaining trash, small or withered beans that may still remain are blown against another cylindrical screen or wire roller 11' and over said cylinder in the same manner as described with respect to cylinder 11. The foraminous cylinder 11' is freely mounted so as to ride on the grading belt 25 and to be rotated thereby, having its end shafts 12' mounted in upright slots 13' formed by a U-shaped brace 30 whose ends are fixed to the upright 1' and is provided with a bar 31 extending between its arms to form the slot 13'.

The blower 17' may be identical to the blower 17 and is adjustably supported by the structure 2 by means of a bracket 35 having a slot 36 adapted to receive a bolt 37 carried by blower 17'. The bracket 35 is supported by an upright 38 that is adjustably supported by the structure 2, the upright 38 having a slot 39 for receiving a bolt 40 that cooperates with any of a plurality of bolt holes 41 located in an inclined longitudinal brace 42. The upright 38 likewise has a bolt 43 adapted to coincide with any of a plurality of bolt holes 44 in the bottom horizontal longitudinal brace 45. By this arrangement the blower 17' may be raised or lowered or pivoted by means of the bolt 37 and slot 36, and it may be spaced from the roller 11' by positioning the upright 38 relative to the longitudinal braces 42 and 45 of the supporting structure 2. Needless to say, the cleaning operations as above described are very rapid, the actual cleaning action being effected while the beans are dropping between the belts and while they are travelling forward on the belts.

After the second cleaning action the beans are transported by the grading belt 25 along the length thereof during which time the beans are graded in the desired manner by grading personnel positioned along the belt. The beans remaining on the belt are dumped over the end of the belt on roller pulley 27 to the chute 50 which directs the beans into collecting hampers. The chute 50 is supported at such an angle that the beans readily fall from the belt and do not have to be pulled therefrom by hand. To assist in the grading operation, illuminators 51 are supported by a central longitudinal brace 52 mounted on uprights 53 and 54 which form a part of the supporting structure 2.

The drive mechanism is divided into two sections in much the same manner as the operation and structural features of the machine. A motor 60 is mounted on the supporting structure 1 and is provided with a drive wheel 62 which may be in the form of a pulley and be connected by a belt 63 with a large wheel 64. Although this drive mechanism is identified as being of the belt type, it is to be understood that chains and sprockets or even gear trains may be substituted therefore. The large wheel 64 is mounted on a shaft 65 which also supports a small pulley 66 that is connected by a belt 67 to a wheel 68. The wheel 68 is co-mounted with a pulley 70 on a shaft 71, the pulley 70 being double-grooved and driving two belts 72 and 73. The belt 72 drives a pulley 74 mounted on a shaft 75 which supports a roller 76 that comprises the upper end of belt 5. The belt 73 drives pulley 80 that is mounted on shaft 81 which supports roller 82 that supports the upper end of belt 10.

Pulley 74 is a double pulley and is connected by belt 85 with pulleys 86 and 87 mounted on shafts 88 and 89 respectively, which support the reels 6. Pulley 95 is also carried by shaft 88 and connected by belt 96 to a wheel 97 which is co-mounted with a small pulley 98 on shaft 99. Pulley 98 drives a belt 100 which in turn drives wheel 101 which is co-mounted with the upper roller 102 supporting belt 4 on a shaft 103. Wheel 101 is a double pulley and is also connected by a belt 104 with a pulley 105 that is mounted on a shaft 106 which carries the first of the reels 6 which is positioned above the upper end of the belt 4. It may be pointed out that the lower ends of each of the inclined belts is supported by an adjustably mounted roller to facilitate the proper tensioning of the belt. As all of the rollers are essentially the same, it is sufficient to describe the structure of the roller 110 which carries the lower end of belt 4.

As shown in Fig. 3, the roller 110 is supported by a shaft 111 that is journaled in a slidable member 112. The member 112 is slidably mounted in a slideway 113 and is provided with a threaded aperture 114 adapted to receive an elongated threaded member 115 that is seated in the lower end 116 of the slideway 113. Thus by turning the threaded member 115, the slide 112 is adjusted along the slideway 113 to move the roller 110 so as to tighten or loosen the belt 4. Incidentally, the return runs of the belts may be supported by one or more idler pulleys 118.

The drive system for that portion of the apparatus supported by the structure 2 is relatively simple and comprises a variable speed motor 125 having a drive pulley 126 that is connected by a belt 127 to the wheel 128. The wheel 128 is mounted on a shaft 129 upon which is also journaled a pulley 130 which is connected by a belt 131 to a pulley 132. The pulley 132 is co-mounted on a shaft 133 with a pulley 134 that drives a belt 135 which is connected to a pulley 136 mounted on the head shaft 137 that supports the roller 27 that carries and drives the belt 25.

The motor 125 is preferably adjustably supported so as to readily take up slack in the belt 127. Accordingly, as shown in Fig. 4, it is mounted on a slide 140 which rides in a slideway 141 carried by the lower horizontal longitudinal brace 45. The slide member 140 is provided with a threaded aperture 142 adapted to cooperate with a threaded member 143 which is connected to and operated by a hand crank 144.

One of the foraminous cylinders is shown in detail in Fig. 2 wherein it may be seen that they are simply constructed of a roll of screen 175 which is fixed around a plurality of discs 176 that are spaced along the roller supporting shaft 12. The discs 176 may be braced by longitudinally extending bars 177, the outer discs 176 being fixed to hubs 178 that are slightly larger in diameter than the discs 176. These hubs 178 are adapted to ride on the belts over which they are mounted and the rollers are rotated by the frictional engagement between the hubs 178 and the driven belts, thus eliminating undue wear of the screens 175 by spacing the screens above the belts. Bearing flanges 179 are fixed outside of the hubs 178 on the shafts 12 to bear against the inner sides of the members forming the slots 13, and set collars 180 may be positioned on the outer extremities of the shaft 12 to bear against the outer sides of the members forming the slots 13.

In general, the supporting structures 1 and 2 may be in skeleton form; however, it is advantageous to enclose the sides of the machine that are adjacent the bean handling belts and the separating areas between the foraminous cylinders and the air directing nozzles. Accordingly, side plates 150 are mounted on either side of the dumping belt 4 and extend to enclose the level belt 5, a hood 155 being mounted above said side plates 150 to cover the germicidal lamps and enclosing the sterilization area. Similarly, side plates 151 are positioned on either side of the cleaning belt 10, enclosing the area covered by the air stream emanating from the nozzle 20 to the foraminous cylinder 11. At the second cleaning station side plates 152 are mounted between the end uprights 2' of the supporting structure 2 and the side rails 153 that extend along the grading belt 25. By these arrangements all necessary enclosures are provided without entailing the cost and additional weight that would be involved by enclosing the whole machine.

Although a certain specific embodiment has been shown and described, it is quite obvious that many modifications thereof are possible. The invention, therefore, is not to be restricted except insofar as is necessitated by the prior art and by the spirit of the appended claims.

That which is claimed as new is:

1. A machine for cleaning podded vegetables comprising a plurality of driven conveyor belts arranged one below the other so that a lower belt will receive the vegetables dropped thereupon from the discharge end of an upper belt to form repeated cleaning stations, means discharging and directing a current of air over and adjacent the surface of each of the lower belts and in a direction opposite to the direction of travel of the conveying surfaces of said belts to blow stalks, leaves and other trash from the podded vegetables as they drop from one belt to another and while being conveyed on and by said belts, rotatable foraminous obstructions positioned between the discharge end of one belt and the receiving end of a cooperating lower belt respectively, and transversely disposed relative to the latter to restrict material on said lower belts from passing therebetween, each of said foraminous obstructions being in the line of flow of said air current over and along its belt and being mounted to be driven in a direction that its surface nearest the air directing means goes upwardly away from its cooperating lower belt so that said trash will impinge thereagainst and adhere thereto and be moved away from the cooperating lower belt over said obstruction and be blown from the other side of the obstruction by the air passing therethrough.

2. A machine as set forth in claim 1 wherein the foraminous obstruction is cylindrical and rotated by frictional contact with said belts, respectively.

3. A machine for cleaning podded vegetables which comprises an inclined conveyor belt means forming a cleaning station and having its conveyor surface driven upwardly, a mechanism for loosening and supplying a relatively even quantity of material consisting of podded vegetables, dirt and trash such as vines, leaves, stalks and the like that cling to the vegetables when they are picked and including a conveyor belt which drops said material upon the lower end of said first-mentioned inclined belt, means for directing an air stream over adjacent the conveying surface of said first-mentioned belt opposite to its direction of travel and having a velocity sufficient to blow away the trash while it is being conveyed by the belt, but not the podded vegetables of normal development, size and weight, a second cleaning station including a grading belt for receiving said material dropped from said first cleaning station, means for directing a second air stream of sufficient velocity to blow any remaining dirt from the vegetables delivered at said second cleaning station, means for actuating said belts, and a rotary foraminous obstruction at each cleaning station and positioned contiguous to and transversely of the receiving end of said first-mentioned belt means and said grading belt, respectively, and mounted to have its surface nearest said air directing means moved upwardly from and relative to the conveying surface of said last mentioned belts in advance of the point of drop of said material thereon, so that said trash will be blown to impinge thereagainst and adhere thereto, said air stream passing through said obstructions and blowing said material adhering thereto from the opposite downwardly moving surface of said obstructions.

4. A machine for handling materials including podded vegetables and trash such as vines, stalks, leaves and the like, and for separating the trash to recover the podded vegetables, which comprises means for supplying a relatively even quantity of loosened material to a driven endless belt, a rotary foraminous obstruction mounted on and extending above and across the width of said belt, means for supplying air under pressure to a nozzle positioned slightly above said belt and extending the width thereof, said nozzle being spaced from said obstruction and arranged to direct an air stream adjacent the upper surface of said belt and through said obstruction, said air stream having a velocity sufficient to blow trash from said material on said belt to said obstruction but not to disturb the podded vegetables of normal development, size and weight, the trash being caught and carried away from said belt by said movable obstruction, and means to drive said obstruction from said belt to transport the podded vegetables thereon away from said obstruction against said air stream and under said nozzle.

5. A machine for handling material including podded vegetables and trash such as vines, stalks, leaves and the like, and for separating the trash to recover the podded vegetables which comprises means for supplying a relatively even quantity of loosened material to a driven endless belt, a foraminous cylinder extending the width of and loosely mounted over said belt and resting in frictional engagement thereon to be rotated thereby, means for supplying air under pressure to a nozzle positioned slightly above said belt and extending the width thereof, said nozzle being spaced from said cylinder and arranged to direct an air stream along said belt and diametrically through said cylinder, said air stream having a velocity sufficient to blow trash from said material on said belt to said cylinder but not to disturb the podded vegetables of normal development, size and weight, the trash being carried by and over said cylinder and blown from the far side thereof by the air passing through said cylinder, and means to drive said belt to transport the podded vegetables thereon away from said cylinder against said air stream and under said nozzle.

6. A machine for handling material including podded vegetables and trash such as vines, stalks, leaves and the like which cling to the vegetables when they are picked, and for separating the trash to recover the podded vegetables which comprises means for supplying a relatively even quantity of loosened material to a driven endless belt, a foraminous cylindrical obstruction rotatably mounted over and in substantial contact with and extending the width of said belt, a nozzle extending the width of and positioned slightly above said belt and spaced from said obstruction, said nozzle being arranged to direct an air stream along said belt and through said obstruction and being adjustably mounted to permit variation in its spacing relative to the obstruction and to the belt and to permit angular orientation of the air stream projected thereby, said air stream being such as to blow trash from said material as it falls to and is conveyed by said belt to said obstruction but not to disturb the podded vegetables of normal development, size and weight, the trash being removed from said belt by said movable obstruction, and means to drive said belt to transport the podded vegetables thereon against said air stream and under said nozzle.

7. A machine for removing trash that adheres to picked podded vegetables which comprises a dumping belt upon which the picked vegetables are initially dumped and whose conveying surface is upwardly inclined to cause, in conjunction with the motion thereof, the tumbling of the piles of dumped vegetables to loosen and primarily spread them, a spreading and leveling belt driven at a faster speed than said dump belt and arranged to receive the vegetables dropped from the dumping belt and whose conveying surface is upwardly inclined, a cleaning belt arranged to receive the vegetables dropped from said leveling belt and whose conveying surface is inclined upwardly, an upwardly inclined grading belt adapted to receive vegetables dropped from said cleaning belt, a plurality of rotatable fingers positioned above said spreading and leveling belt to break up any entanglements of and spread said vegetables in a relatively even layer on said belt, a foraminous cylinder rotatably supported upon the receiving end of said cleaning belt and beneath the discharge end of said spreading and leveling belt, a second foraminous cylinder rotatably supported upon said grading belt pulley and beneath the discharge end of said cleaning belt, means for driving said belts and said rotatable fingers, and an adjustably positioned means for directing an air stream along said cleaning and grading belts opposite to its direction of travel and diametrically through said foraminous cylinder to blow trash from said vegetables to impinge upon and adhere to said cylinders and to be carried by said cylinder from said cleaning and grading belts, means for driving said grading belt at selected variable speeds, and means for supplying air under pressure to said air directing means.

8. In a machine for removing field trash that adheres to picked vegetables, means for receiving said vegetables and movable to discharge the same in a relatively even flow, an endless conveyor belt arranged to receive said vegetables discharged from said receiving means, a foraminous cylindrical member extending above and across the receiving end of said conveyor belt and beneath the discharge end of said receiving means, said foraminous member having tractional contact with said conveyor belt from which it is rotated about its axis, means for imparting motion to said receiving means and said conveyor belt, and means for directing an air stream along the carrying surface of said belt opposite to its direction of travel and through said foraminous member to blow trash from said vegetables along the belt to be impinged against said foraminous member and carried by the latter from said belt.

9. In a machine for removing trash that adheres to picked vegetables, means for receiving the picked vegetables and movable to discharge the same in a relatively even flow, an endless conveyor belt arranged to receive the vegetables from said means, a second conveyor belt arranged to receive the vegetables from said first conveyor belt, a movable continuous screen mounted and extending laterally from and across the conveying surface at the receiving end of said first belt and beneath the discharge end of said means, a second movable continuous screen mounted and extending laterally from and across the conveying surface at the receiving end of said second belt and beneath the discharge end of said first belt, the surfaces of said screens being adapted to move about their mountings, means for imparting motion to said first-mentioned means and said belts and to said screens in an upward direction from the conveying surfaces of said belts, and means for directing air streams adjacent the conveying surfaces of said belts opposite to their direction of travel and through said screens to blow trash from said vegetables along said belts to be impinged upon and carried by said members from said belts.

10. In a machine for removing field trash that adheres to picked vegetables, a frame, an endless conveyor belt operatively mounted in the frame, means for moving the belt in one direction, an air nozzle mounted above the conveyor belt with just sufficient space therebetween for passage of vegetables and disposed to project an air stream along said belt in a direction counter to the movement of the belt, means for dropping vegetables to be cleaned onto the conveyor belt at a point downstream from the air nozzle, a trash-obstructing member disposed above the conveyor belt facing the air nozzle further downstream than the point where vegetables drop on the belt, said member consisting of a foraminous cylinder extending transversely with respect to the conveyor belt, end hubs on the cylinder which bear on the belt for rotation by contact therewith and which are of larger diameter than the cylinder to afford slight clearance from the belt, and shaft sections projecting outwardly from the hubs, and bearing slots for the shaft ends provided in the frame and disposed in a direction normal to the belt to prevent lengthwise displacement of the obstructing member with respect to the belt.

11. In a machine for separating picked podded vegetables and the like, from incidental matter, such as leaves, stems, etc., mixed therewith incidentally to the picking of the vegetables, in combination, a conveyor belt, means for driving said belt in one direction, delivery means positioned to drop podded vegetables mixed with the incidental matter, onto said belt at a receiving location thereon intermediate its ends, means disposed and adapted to direct a current of air adjacent the conveying surfaces of the belt in a direction opposite to the direction of belt travel and toward and through the said receiving location and against a rotary screen member positioned on the opposite side of said receiving location from the air directing means, said rotary screen member being positioned so close to the belt as to prevent any vegetables from passing between the rotary member and the belt, and means for rotating said rotary member in a direction moving the surface of said member which faces the air current upwardly of the belt, said screen member being constituted to catch and hold for upward movement thereby incidental matter brought against the upwardly rotating surface thereof by the air current and to release said matter when at the top and downwardly rotating surfaces thereof.

12. In a machine for separating picked podded vegetables and the like, from incidental picked matter, such as leaves, stems, etc., mixed therewith incidentally to the picking of the vegetables, in combination, a conveyor belt, means for driving said belt in one direction, delivery means positioned to drop onto said belt at a receiving location thereon picked vegetables and accompanying incidentally picked matter, a rotatable screen member disposed above and across said belt at a location spaced in advance of said receiving location relatively to the direction of belt movement, a blower adjustably mounted and positioned to the rear of said receiving location relatively to the direction of belt movement to blow an air stream adjacent the conveying surfaces of said belt in a direction counter to belt movement and through said receiving location of the belt and against said screen member, means for adjusting said blower to vary the force of said air stream, whereby said air stream blows incidentally picked matter deposited on the belt against the facing surface of the foraminous member, said foraminous member being positioned so close to the belt as to prevent podded vegetables from passing between the belt and said member and means for rotating the screen member in a direction moving the surface thereof facing the air stream upwardly of the belt, said screen member being constituted to catch and hold for upward movement thereby incidental matter brought against the upwardly moving surface theerof by the air stream and to release said matter when it is at the top and downwardly moving side of the rotating screen member.

13. In a machine of the character described, in combination, an upwardly inclined dump belt adapted to receive vegetables and the like adjacent its lower end and to convey the vegetables to and dump the vegetables from its upper end, means for driving the dump belt, an upwardly inclined spreader belt positioned to receive adjacent its lower end vegetables as they are dumped by the dump belt and adapted to convey the vegetables to and to discharge the vegetables from its upper end, means for driving the spreader belt at a faster speed than the dump belt, operable spreader devices positioned over the spreader belt and adapted to engage and spread vegetables on the belt as they are carried along thereby, means for operating the spreader devices, an upwardly inclined cleaner belt positioned to receive adjacent its lower end vegetables as they discharge from the spreader belt and to convey the vegetables to and to discharge the vegetables from its upper end, means for driving the cleaner belt, a cleaning device including a blower and a screen spaced apart along the path of travel of the vegetables with the cleaner belt and so positioned relatively to each other and to the belt that the blower blows an air stream along the belt in a direction opposite to the direction of belt travel and against the screen, whereby said air stream blows leaves, stems and the like from among the vegetables and onto the screen, the screen being positioned close to the belt to prevent vegetables from passing between the screen and the belt, a grader belt positioned to receive adjacent its oncoming end vegetables as they are discharged from the cleaner belt, and means for driving the grader belt at variable speeds, whereby the speed of the grader belt may be regulated in accordance with the character of the vegetables and the rate of their delivery to the grading belt.

JAMES C. DOOLITTLE.

REFERENCES CITED

The following references are of record in the file of this patent:

UNITED STATES PATENTS

| Number | Name | Date |
|---|---|---|
| 253,771 | Sebillot | Feb. 14, 1882 |
| 300,043 | Card et al. | June 10, 1884 |
| 529,340 | Watson et al. | Nov. 13, 1894 |
| 614,574 | Patterson | Nov. 22, 1898 |
| 989,233 | Cornwall | Apr. 11, 1911 |
| 1,175,190 | Stuart | Mar. 14, 1916 |
| 1,323,877 | Lee et al. | Dec. 2, 1919 |
| 1,491,211 | Taylor | Apr. 22, 1924 |
| 1,549,102 | Arpin | Aug. 11, 1925 |
| 1,827,530 | LeGrand | Oct. 13, 1931 |
| 1,911,913 | Mayor | May 30, 1933 |
| 2,064,522 | Davis | Dec. 15, 1936 |
| 2,095,502 | Johnston | Oct. 12, 1937 |
| 2,114,727 | Thys | Apr. 19, 1938 |
| 2,134,216 | Sutter | Oct. 25, 1938 |
| 2,183,233 | Zink | Dec. 12, 1939 |
| 2,210,103 | Stoner | Aug. 6, 1940 |
| 2,226,009 | Miller | Dec. 24, 1940 |
| 2,350,096 | Chilton | May 30, 1944 |
| 2,428,090 | Naeher et al. | Sept. 30, 1947 |

FOREIGN PATENTS

| Number | Country | Date |
|---|---|---|
| 257,284 | Great Britain | Feb. 10, 1927 |